United States Patent
Atkins et al.

(10) Patent No.: US 11,870,948 B2
(45) Date of Patent: Jan. 9, 2024

(54) PICTURE METADATA FOR VARIABLE FRAME-RATE VIDEO

(71) Applicant: Dolby Laboratories Licensing Corporation, San Francisco, CA (US)

(72) Inventors: Robin Atkins, Vancouver (CA); Ian Godin, Santa Clarita, CA (US); Peng Yin, Ithaca, NY (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 17/925,444

(22) PCT Filed: May 26, 2021

(86) PCT No.: PCT/US2021/034275
§ 371 (c)(1),
(2) Date: Nov. 15, 2022

(87) PCT Pub. No.: WO2021/242873
PCT Pub. Date: Dec. 2, 2021

(65) Prior Publication Data
US 2023/0133582 A1     May 4, 2023

Related U.S. Application Data

(60) Provisional application No. 63/029,776, filed on May 26, 2020.

(30) Foreign Application Priority Data

May 26, 2020   (EP) ..................... 20176416

(51) Int. Cl.
*H04N 19/70*     (2014.01)
*H04N 19/172*    (2014.01)
(Continued)

(52) U.S. Cl.
CPC .......... *H04N 19/70* (2014.11); *H04N 19/167* (2014.11); *H04N 19/172* (2014.11); *H04N 19/177* (2014.11); *H04N 21/440281* (2013.01)

(58) Field of Classification Search
CPC .... H04N 19/70; H04N 19/172; H04N 19/177; H04N 21/440281
See application file for complete search history.

(56) References Cited

U.S. PATENT DOCUMENTS

| 7,242,850 B2 | 7/2007 | Cok |
| 8,559,798 B2 | 10/2013 | Aoki |

(Continued)

FOREIGN PATENT DOCUMENTS

| EP | 1237370 B1 | 6/2006 |
| WO | 2019067762 | 4/2019 |
| WO | 2022015540 | 1/2022 |

OTHER PUBLICATIONS

Callway, ED "Variable Frame Rate Technology—Change is Good!" SMPTE Meeting Presentation, 2018 Society of Motion Picture & Television Engineers, pp. 1-11.

(Continued)

*Primary Examiner* — Kyle M Lotfi

(57) ABSTRACT

Metadata and methods for variable-frame rate (VFR) video playback are presented. Proposed metadata include syntax parameters related to the presentation time duration, picture source type (e.g., original, duplicate, or interpolated), picture position in a scene (e.g., first, last, or in the middle), and motion-related information with respect to a previous picture. A decoder may use these metadata to apply appropriate frame-rate conversion techniques to reduce artifacts during VFR playback.

15 Claims, 2 Drawing Sheets

(51) Int. Cl.
*H04N 19/177* (2014.01)
*H04N 21/4402* (2011.01)
*H04N 19/167* (2014.01)

(56) References Cited

U.S. PATENT DOCUMENTS

| | | |
|---|---|---|
| 8,761,257 B2 | 6/2014 | Demos |
| 8,861,932 B2 | 10/2014 | Shaw |
| 9,286,709 B2 | 3/2016 | Nash |
| 9,552,623 B1 | 1/2017 | Cheng |
| 9,609,049 B2 | 3/2017 | Soroushian |
| 9,928,297 B2 | 3/2018 | Hendry |
| 10,074,014 B2 | 9/2018 | Teuton |
| 10,368,074 B2 | 7/2019 | Holcomb |
| 2007/0036220 A1 | 2/2007 | Koto |
| 2018/0082429 A1 | 3/2018 | Choudhury |
| 2019/0180454 A1 | 6/2019 | Choudhury |
| 2019/0273927 A1 | 9/2019 | Sullivan |

OTHER PUBLICATIONS

ITU "Infrastructure of Audiovisual Services—Transmission Multiplexing and Synchronization" H.222.0, Series H. Generic Coding of Moving Pictures and Associated Audio Information: Systems, ITU, Aug. 2018.
Lu, G. et al "A Novel Frame Rate Up Conversion Using Iterative Non-Local Means Interpolation" IEEE International Symposium on Broadband Multimedia Systems and Broadcasting (BMSB), pp. 1-5, 2017.

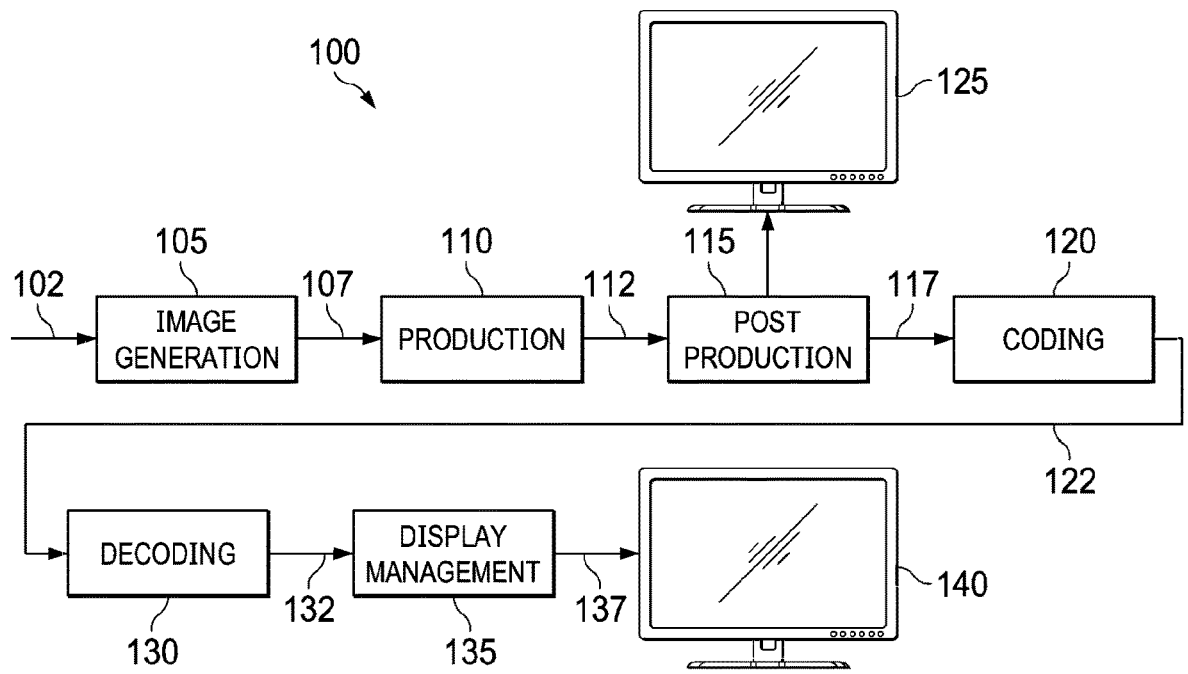
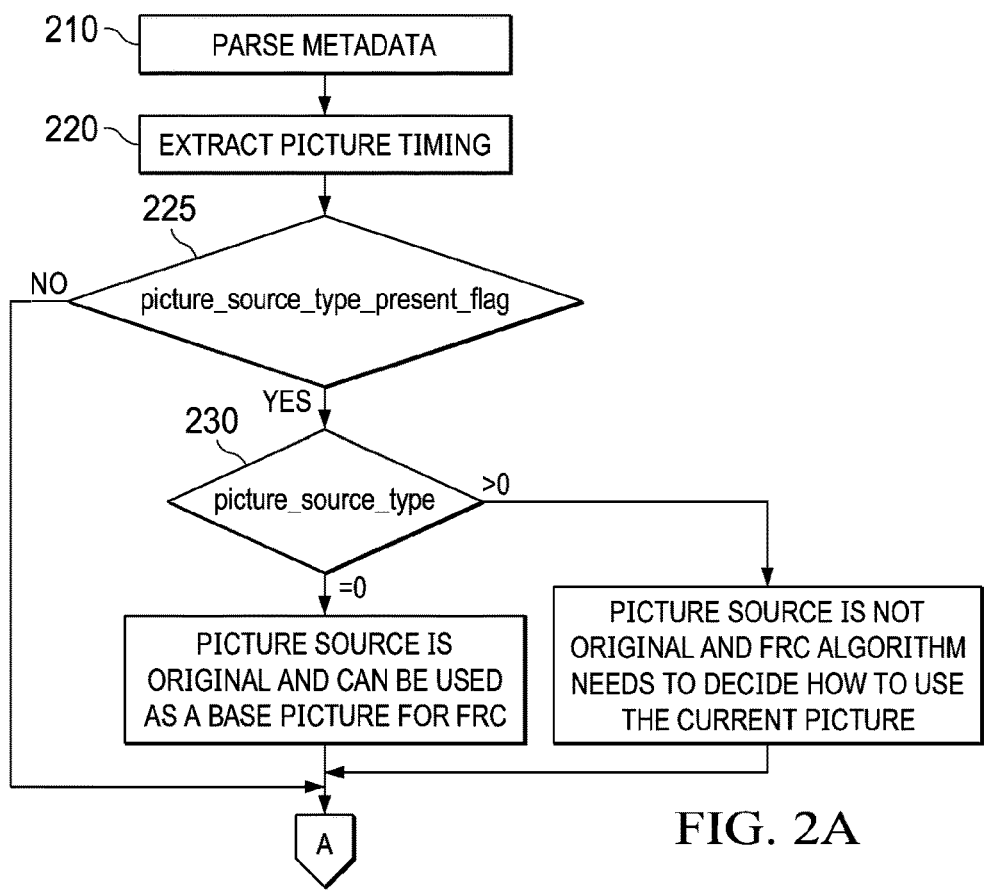
FIG. 1
FIG. 2A

PICTURE METADATA FOR VARIABLE FRAME-RATE VIDEO

CROSS-REFERENCE TO RELATED APPLICATIONS

This application claims the benefit of priority from U.S. Provisional Patent Application No. 63/029,776, filed on 26 May 2020, and European Patent Application No. 20176416.4, filed on 26 May 2020, which are hereby incorporated by reference.

TECHNOLOGY

The present invention relates generally to images. More particularly, an embodiment of the present invention relates to metadata to be used for playback of variable frame rate video sequences.

BACKGROUND

Conventional video sequences or bitstreams contain a sequence of frames or pictures each intended to be displayed for a fixed time duration. For example, at 30 frames per second (fps), each image is displayed for 1/30 s. Such a bitstream can be denoted as a "standard frame rate" (SFR) or fixed frame rate video.

A new type of video bitstream may allow each individual picture to be displayed for variable time, different for each picture. Such a bitstream is denoted as "variable frame rate" video.

As used herein, the term "metadata" relates to any auxiliary information that is transmitted as part of a coded bitstream or sequence and assists a decoder to render a decoded image. Such metadata may include, but are not limited to, color space or gamut information, reference display parameters, and auxiliary signal parameters, as those described herein.

To improve existing and future display schemes, as appreciated by the inventors here, improved techniques for generating and using metadata for variable frame rate video are needed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which:

FIG. 1 depicts an example process for a video delivery pipeline; and

FIG. 2A and FIG. 2B depict an example process flow for applying metadata for variable frame rate video according to an embodiment of this invention.

DESCRIPTION OF EXAMPLE EMBODIMENTS

Figure 2B:
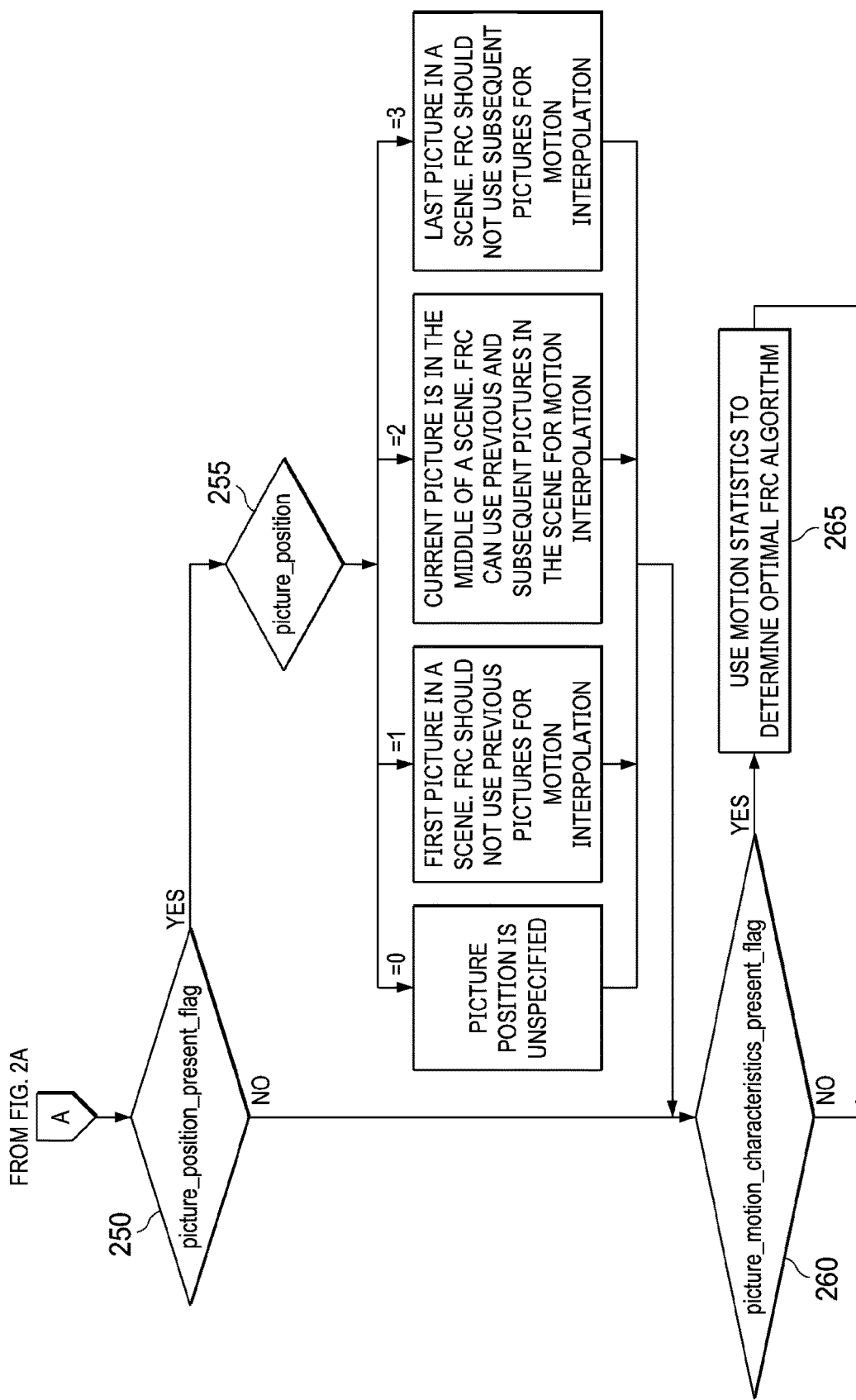

Methods and metadata for variable frame-rate bitstreams are described. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, to avoid unnecessarily occluding, obscuring, or obfuscating the present invention.

SUMMARY

Example embodiments described herein relate to methods and metadata for variable frame-rate video. In a decoder, a processor receives a sequence of video pictures and metadata, wherein the metadata comprise syntax parameters for enabling displaying the video pictures at a variable frame rate, wherein the syntax parameters comprise a picture-timing-present flag, a picture-source-type flag, and a picture-position-type flag. The processor displays the video pictures according to the syntax parameters in the metadata, wherein for a current picture among the video pictures:
  if it detects that the picture-timing-present flag is set to 1, then
  it generates a time information of presentation on a display for the current picture based on a picture presentation time parameter in the metadata;
  if it detects that the picture-source-type flag is set to 1, then
  it generates picture source information for the current picture based on a picture source parameter in the metadata; and
  if it detects that the picture-position-type flag is set to 1, then
  it generates picture position information for the current picture based on one or more picture position parameters in the metadata.

In another embodiment, in a non-transitory processor-readable medium having stored thereon an encoded video stream structure, the encoded video stream structure comprises:
  an encoded picture section including an encoding of a sequence of video pictures; and
  a signaling section including an encoding of metadata comprising syntax parameters for enabling displaying the sequence of the video pictures at a variable frame rate, wherein the syntax parameters comprise a picture-timing-present flag, a picture-source-type flag, and a picture-position-type flag; and
  for a current picture among the sequence of video pictures:
    if the picture-timing-present flag is set to 1, then it includes
    a picture presentation time parameter in the metadata;
    if the picture-source-type flag is set to 1, then it includes
    a picture source parameter in the metadata; and
    if the picture-position-type flag is set to 1, then it includes
    one or more picture position parameters in the metadata.

Metadata for Variable Frame Rate Video

Video Coding of Signals

FIG. 1 depicts an example process of a conventional video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." It may also include frame/picture rate resampling. Other editing (e.g. scene selection and sequencing, image cropping, addition of computer-generated visual special effects, variable frame rate sequencing, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range or frame rate of decoded signal (132) to the characteristics of the target display (140) by generating display-mapped signal (137).

Variable frame rate (VFR) bitstreams introduce some new challenges in the video ecosystem, including:
1) During content creation, some content may be up-sampled from a low frame rate to a higher frame rate in order to produce a smoother looking video. Common techniques to do this include interpolating new frames in between original frames, using motion-estimation and motion-compensation algorithms. The interpolated frames may contain image artifacts that are not objectionable when viewed in motion but could be objectionable when viewed in a still frame.
2) During VFR content creation, some frames may be repeated multiple times. For example, an original frame, which was intended to be displayed for $1/24^{th}$ of a second, may be replicated five times, with each frame intended to be displayed for $11120^{th}$ of a second. The resulting five frames should produce the same image when displayed on a screen.
3) During VFR playback or content creation, it may be necessary to combine the VFR content with other content at a different frame rate. This requires resampling the VFR video to a different frame rate.

Example embodiments describe metadata and decoding processed that address all these issues and improve the display of VFR video sequences.

In an embodiment, proposed new metadata fields are intended to improve the encoding, processing, and playback of variable frame rate content. Such frame-rate-conversion metadata may be adapted at the whole sequence, at the scene level, or at the picture level. These frame-rate-conversion metadata refer to the viewable frame rate, not the transmitted frame rate. This frame rate metadata may be chosen by a content producer during the post-production phase (115) (e g, manually or by a combination of computer-based tools and human interaction) or they may be derived automatically based on scene characteristics during post-production or as part of the encoding phase (120).

Metadata Description

Picture Time

This parameter may denote the time duration that the frame (or picture) is intended to be displayed. In an embodiment, this could be a duplicate of the MPEG "presentation time" SEI message. Alternative mechanisms are also presented later on.

Picture Source

This parameter denotes the source type of the picture. For example, without limitation, in an embodiment, 0 may denote an original picture, 1 may indicate a replicated picture, and 2 may denote an interpolated picture. As an example, and without limitations, this parameter may be used for the following purposes:
1) An encoder uses Picture Source to help determine suitable intra random access point IRAP pictures, including instantaneous decoded refresh (IDR) pictures or clear random access (CRA) pictures. To avoid using interpolated pictures which may contain image artifacts, in an embodiment, only pictures with Picture Source equal to 0 should be used as an IRAP picture.
2) An encoder uses Picture Source to help determine which images to store in a decoded picture buffer or which need to be encoded. There is no need to allocate memory for duplicated pictures, because they do not add any additional information to the compression process. Instead, memory can be used for original and interpolated pictures to improve compression performance.
3) A playback device uses Picture Source to prevent pausing on interpolated or duplicated pictures. This prevents viewers from pausing on an interpolated picture, which may contain image artifacts. This can be used both during content creation and playback.
4) Image processing at playback uses Picture Source to prevent additional processing of the same picture twice—instead the previous picture can be repeated to save power.
5) Frame rate conversion algorithms at playback may use the Picture Source information when applying resampling algorithms Duplicated or interpolated pictures can be ignored when applying picture rate conversion algorithms.

Picture Position

This parameter denotes the position of a picture in a scene or a group of pictures. For example, when using a two-bit field, one may assign its values as: 0=unknown/unspecified, 1=first picture, 2=middle picture, 3=last picture. This parameter may be used to guide motion resampling. If the picture is the first picture in a scene, motion estimation algorithms ignore previous pictures when estimating motion. If it is the last picture, motion estimation algorithms ignore subsequent pictures. If it is a middle picture, motion estimation algorithms can use both previous and subsequent pictures to estimate motion. By iteratively comparing the Picture Position of the previous and subsequent pictures, the motion estimation algorithm can establish a window of valid pictures to use for motion interpolation. If the Picture Position is unknown or unspecified, the motion estimation algorithm can attempt to guess at scene cuts, or simply use all neighboring pictures.

Motion Mean and Motion Standard Deviation

The parameters denote the mean and standard deviation of the entire image with reference to the previous picture. As examples, in an embodiment, Motion Mean may be represented in integer form as (1−mean (motion))*255, and Motion Standard deviation may be represented as (1−std_dev(motion))*255, where the functions mean(motion) and std_dev(motion) compute the mean and standard deviation of motion in a non-integer representation and normalized in [0, 1].

In an embodiment, these parameters may be used during picture rate resampling, where Motion Mean and Motion Standard Deviation values can be used to select the picture rate conversion algorithm, commonly referred to as frame rate conversion (FRC). For example, pictures with high mean motion but low standard deviation indicate that the motion is dominated by a camera pan. Then, the optimal picture rate resampling algorithm may be based on calculating the full displacement of the entire image. Alternately, pictures with low mean motion but high standard deviation indicate that the motion is dominated by objects moving within the image. Then the optimal picture rate resampling algorithm may be to replicate the pictures without interpolation.

Motion statistics may not be limited to mean and standard deviation. In other embodiments, other statistics with higher order, such as kurtosis, skewness, or histogram distribution, can be used too. Motion characteristics can also comprise information about the type of motion, such as random, panning, zooming, and the like. Motion statistics can also be indicated for more than one picture, such as a group of pictures or one scene, to provide better temporal consistency. There are various means to compute motion statistics. In one embodiment, motion is computed using block based motion estimation.

For example, one could:
subdivide a frame into non overlapping blocks
compute a motion vector mv[i]=($x_i$,$y_i$) for each block with respect to a previous frame
compute the amplitude of each motion vector, e.g., $$r[i] = \sqrt{x_i^2 + y_i^2};$$

and
then compute the mean and standard deviation of the r[i] values.

Example of alternative methods known in the art, as those being used in computing "optical flow" and frame-rate conversion techniques, can be found Refs. [1-3].

In an embodiment, in addition to using only amplitude values (e.g., r[i]), the direction of motion can be used as well, and can be signaled separately from motion amplitude statistics. In another embodiment, one may separate camera motion and object motion. The motion statistics mentioned earlier compute object motion (or local motion). In metadata, camera motion (typically referred to as global motion) may also be explicitly signaled besides local motion statistics. In another embodiment, separate background and foreground motion and motion statistics can be signaled for background and foreground objects.

Note that the way pictures or frames are characterized during compression (e.g., as I, P, or B frames) does not need to match how they are marked in the VFR metadata for motion interpolation after decompression. For example, a codec may insert an I-frame every two seconds to start coding a new group of pictures (GOP); however, for a motion interpolation algorithm in frame-rate conversion it may be desired to use frames across that coding boundary, since those I-frames may have nothing to do with motion within a scene.

As an example, Table 1 describes an embodiment of VFR metadata using syntax conforming to syntax for supplemental enhancement information (SEI) in the MPEG video coding standards. The Descriptor field in Table 1 conforms to the one used in existing MPEG and ITU standards (e.g., AVC, HEVC, and the like).

TABLE 1

Example SEI messaging for VFR metadata

| | Descriptor |
|---|---|
| picture_rate_conv_hint_info( payloadSize ) { | |
|   picture_timing_present_flag | u(1) |
|   picture_source_type_present_flag | u(1) |
|   picture_position_present_flag | u(1) |
|   picture_motion_charateristics_present_flag | u(1) |
|   if( picture_timing_present_flag ) | |
|     picture_presentation_time | u(33) |
|   if( picture_source_type_present_flag ) | |
|     picture_source_type | u(2) |
|   if( picture_position_present_flag ) | |
|     picture_position | u(2) |
|   if( picture_motion_charateristics_present_flag ) { | |
|     motion_mean | ue(v) |
|     motion_standard_deviation | ue(v) |
|   } | |
| } | |

Semantics

The picture rate conversion hint information SEI message of Table 1 describes the content characteristics of the associated picture to guide frame rate conversion.

picture_timing_present_flag equal to 1 specifies that the syntax element picture_presentation_time is present. picture_timing_present_flag equal to 0 specifies that the syntax element picture_presentation_time is not present.

picture_source_type_present_flag equal to 1 specifies that the syntax element picture_source_type is present. picture_source_type_present_flag equal to 0 specifies that the syntax element picture_source_type is not present.

picture_position_present_flag equal to 1 specifies that the syntax element picture_position is present. picture_position_present_flag equal to 0 specifies that the syntax element picture_position is not present.

picture_motion_charateristics_present_flag equal to 1 specifies that the syntax elements motion_mean and motion_standard_deviation are present. picture_position_present_flag equal to 0 specifies that the syntax elements motion_mean and motion_standard_deviation are not present.

Note: picture motion characteristics related syntax may be present for a picture, a scene, a group of frames, and the like.

Note: picture timing can be indicated by various methods: such as the picture timing SEI messaging in AVC, HEVC, or VVC, or the time-code SEI messaging in AVC or HEVC. In an embodiment, the proposed picture presentation timing (PPT) message matches the syntax of the presentation time stamp (PTS) variable being used in MPEG-2 transport (H.222) (Ref. [4]).

picture_presentation_time shall be related to decoding times as follows:

The picture_presentation_time (PPT) is a 33-bit number coded in three separate fields. It indicates the time of presentation, $tp_n(k)$, in the system target decoder of a presentation unit k of elementary stream n. The value of PPT is specified in units of the period of the system clock frequency divided by 300 (yielding 90 kHz). The picture presentation time is derived from the PPT according to equation below.

$$PPT(k)=((system\_clock\_frequency \times tp_n(k))/300)\%2^{33}$$

where $tp_n(k))$ is the presentation time of presentation unit $P_n(k)$.

picture_source_type equal to 0 indicates that the source type of the associated picture should be interpreted as original. picture_source_type equal to 1 indicates that the source type of the associated picture should be interpreted as a duplicate of a previous picture in output order. picture_source_type equal to 2 indicates that the source type of the associated picture should be interpreted as an interpolated picture from previous and/or subsequent pictures in output order. picture_source_type equal to 3 indicates that the source type of the associated picture should be interpreted as unknown or unspecified.

picture_position equal to 1 indicates that the associated picture is the first picture in a scene in output order. picture_position equal to 3 indicates that the associated picture is the last picture in a scene in output order. picture_position equal to 2 indicates that the associated picture is between the first picture and the last picture in a scene in output order. picture_position equal to 0 indicates that the associated picture is in unknown (or unspecified) position in a CVS in output order.

motion_mean indicates the mean displacement of the current picture from the previous picture.

motion_standard_deviation indicates the standard deviation of the displacement of the current picture from the previous picture.

In another embodiment, one can use two fields to indicate picture position. For example, one field (say picture_position_before) may denote the number of prior frames with related motion, and the other field (say picture_position_after) may denote the number of subsequent frames with related motion. For example, for a picture, the values:

1,0 denotes it is the last picture of a scene, related only to the previous picture
2,0 denotes it is the last picture of a scene, related to two of the previous pictures
0,0 denotes it is an independent frame
0,1 denotes it is the first frame and the next frame is related
2, 3 denotes there are multiple related frames before and after (2 before and 3 after)

Such a notation may guide an FRC algorithm to use multiple frames (e.g., 2 or 3 frames) than using a single frame to get better motion information for frame interpolation. On the other hand, such information can also be extracted using the single field picture_position parameter discussed earlier. For example, if the current position is a middle frame and the prior position is a middle frame, then a decoder knows it can use at least two prior frames and a future frame for motion interpolation. Using two fields requires sending more metadata but requires less computational complexity in a decoder to track motion across multiple frames.

FIG. 2A and FIG. 2B provide an example process flow for using metadata in VFR video according to an embodiment.

As depicted in FIG. 2A, given an input video bitstream with VFR-related metadata, after parsing the metadata in step 210, in step 220, the decoder may extract information related to the picture presentation time. Next, it can iterate among the remaining presentation flags. For example, if, in step 225, it detects that picture source data is available, it continues to step 230 to identify the picture source information (e.g., whether the picture is original, a copy, or interpolated).

Moving to FIG. 2B, if in step 250 it detects that picture position information is available, then it continues to step 255 to identify the picture position information (e.g., whether it is the first picture, the last picture, or a middle picture). Next, if in step 260 it detects that motion information is available, then, in step 265, it extracts such information (e.g., Motion Mean and/or Motion Standard Deviation) to facilitate and optimize subsequent frame rate conversion operations.

Without limitation, example embodiments of a video signals with VFR metadata include: in an embodiment, the input video bitstream may comprise a coded (e.g., compressed) bitstream and the VFR metadata may be distributed as supplemental enhancement information (SEI) messaging. In another embodiment, the VFR metadata may be part of the coded bitstream as part of its parameter set, as defined, for example, in a picture parameter set, a picture header, and the like. In another embodiment, the video bitstream may comprise uncompressed pictures in a tangible recording medium (e.g., a disk drive or tape) to be used by an editing application and/or to be transmitted to a display.

Each of these references is incorporated herein by reference in its entirety.

REFERENCES

[1] U.S. Patent Application Publication Ser. No. 2019/0180454, "Detecting motion dragging artifacts for dynamic adjustment of frame rate conversion settings," by AKA Choudhury, et al., Jun. 13, 2019.
[2] U.S. Patent Application Publication Ser. No. 2018/0082429, "Dynamic adjustment of frame rate conversion settings," by AKA Choudhury, et al., Mar. 22, 2018.
[3] G. Lu, et al., "A novel frame rate up conversion using iterative non-local means interpolation," in 2017 IEEE International Symposium on Broadband Multimedia Systems and Broadcasting (BMSB), pp. 1-5. IEEE, 2017.
[4] *Infrastructure of audiovisual services—Transmission multiplexing and synchronization*, H.222.0, Series H, Generic coding of moving pictures and associated audio information: Systems, ITU, August 2018.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions related to metadata for VFR video, such as those described herein. The computer and/or IC may compute any of a variety of parameters or values that relate to metadata for VFR video described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to metadata for VFR video as described above by executing software instructions in a program memory accessible to the processors. The invention may also be provided in the form of a program product. The program product may comprise any tangible and non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to metadata for VFR video are thus described. In the foregoing specification, embodiments of the present invention have been described with reference to numerous specific details that may vary from implementation to implementation. Thus, the sole and exclusive indicator of what is the invention and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEEs):

EEE 1. A method to playback a video stream with variable frame rate, the method performed by a processor and comprising:
receiving the video stream comprising video pictures and metadata, wherein the metadata comprise syntax parameters for enabling displaying the video pictures at a variable frame rate, wherein the syntax parameters comprise a picture-timing-present flag, a picture-source-type flag, and a picture-position-type flag; and
displaying the video pictures according to the syntax parameters in the metadata, wherein for a current picture among the video pictures:
if detecting that the picture-timing-present flag is set to 1, then generating a time information of presentation on a display for the current picture based on a picture presentation time parameter in the metadata;
if detecting that the picture-source-type flag is set to 1, then generating picture source information for the current picture based on a picture source parameter in the metadata; and
if detecting that the picture-position-type flag is set to 1, then generating picture position information for the current picture based on one or more picture position parameters in the metadata.

EEE 2. The method of EEE 1, wherein the syntax parameters further comprise a picture-motion-information-present flag, and
if detecting that the picture-motion-information-present flag is set to 1, then
generating motion statistics for the current picture based on one or more picture-motion-related parameters in the metadata.

EEE 3. The method of EEE 2, wherein the one or more picture-motion-related parameters comprise a motion mean value and a motion standard deviation value indication mean and standard deviation displacement of the current picture and a picture prior in display order to the current picture.

EEE 4. The method of any of EEEs 1-3, wherein the picture source parameter denotes whether the current picture comprises an original picture, a duplicate picture, or an interpolated picture.

EEE 5. The method of any of EEEs 1-4, wherein the one or more picture position parameters comprise a position of the current picture in a group of pictures, wherein the position may be unknown, first among the group of pictures, last among the group of pictures, or in between other pictures in the group of pictures.

EEE 6. The method of any of EEEs 1-5, wherein the one or more picture position parameters comprise a first field denoting a first number of pictures prior in display order to the current picture with motion related to the current picture, and a second field denoting a second number of pictures subsequent in display order to the current picture with motion related to the current picture.

EEE 7. The method of EEE 6, wherein the first field and the second field comprise positive, integer, numbers between 0 and N, wherein N is between 2 and 7 included.

EEE 8. A non-transitory processor-readable medium having stored thereon an encoded video stream structure, the encoded video stream structure comprising:
an encoded picture section including an encoding of a sequence of video pictures; and
a signaling section including an encoding of metadata comprising syntax parameters for enabling displaying the sequence of video pictures at a variable frame rate, wherein the syntax parameters comprise a picture-timing-present flag, a picture-source-type flag, and a picture-position-type flag; and
for a current picture among the sequence of video pictures:
if the picture-timing-present flag is set to 1, then including a picture presentation time parameter in the metadata;
if the picture-source-type flag is set to 1, then including a picture source parameter in the metadata; and if the picture-position-type flag is set to 1, then including one or more picture position parameters in the metadata.

EEE 9. The non-transitory processor-readable medium of EEE 8, wherein the syntax parameters further comprise a picture-motion-information-present flag, and
if the picture-motion-information-present flag is set to 1, then
including one or more picture-motion-related parameters in the metadata.

EEE 10. The non-transitory processor-readable medium of EEE 8 or EEE 9, wherein the picture source parameter denotes whether the current picture comprises an original picture, a duplicate picture, or an interpolated picture.

EEE 11. The non-transitory processor-readable medium of any of EEEs 8-10, wherein the one or more picture position parameters comprise a position of the current picture in a group of pictures, wherein the position may be unknown, first among the group of pictures, last among the group of pictures, or in between other pictures in the group of pictures.

EEE 12. The non-transitory processor-readable medium of any of EEEs 8-11, wherein the one or more picture position parameters comprise a first field denoting a first number of pictures prior in display order to the current picture with motion related to the current picture, and a second field denoting a second number of pictures subsequent in display order to the current picture with motion related to the current picture.

EEE 13. The non-transitory processor-readable medium of EEE 12, wherein the first field and the second field comprise positive integer, numbers between 0 and N, wherein N is between 2 and 7 included.

EEE 14. An apparatus comprising a processor and configured to perform any one of the methods recited in EEEs 1-7.

EEE 15. A non-transitory computer-readable storage medium having stored thereon computer-executable instruction for executing a method with one or more processors in accordance with any one of the EEEs 1-7.

The invention claimed is:

1. A method to playback a video stream with variable frame rate, the method performed by a processor and comprising:
receiving the video stream comprising video pictures and metadata, wherein the metadata comprise syntax parameters for enabling displaying the video pictures at a variable frame rate, wherein the syntax parameters comprise a picture-timing-present flag, a picture-source-type flag, and a picture-position-type flag; and
displaying the video pictures according to the syntax parameters in the metadata, wherein for a current picture among the video pictures:
if detecting that the picture-timing-present flag is set to 1, then
generating a time information of duration of presentation on a display for the current picture based on a picture presentation time parameter in the metadata;
if detecting that the picture-source-type flag is set to 1, then
generating picture source information for the current picture based on a picture source parameter in the metadata, wherein the picture source parameter indicates one of an original picture, a replica of an original picture, or an interpolated picture; and
if detecting that the picture-position-type flag is set to 1, then
generating picture position in a scene information for the current picture based on one or more picture position parameters in the metadata.

2. The method of claim 1, wherein the syntax parameters further comprise a picture-motion-information-present flag, and
if detecting that the picture-motion-information-present flag is set to 1, then
generating motion statistics for the current picture based on one or more picture-motion-related parameters in the metadata.

3. The method of claim 2, wherein the one or more picture-motion-related parameters comprise a motion mean value and a motion standard deviation value indicating the mean and standard deviation of the displacement of the current picture and a picture prior in display order to the current picture.

4. The method of claim 1, wherein the picture source parameter denotes whether the current picture comprises an original picture, a duplicate picture, or an interpolated picture.

5. The method of claim 1, wherein the one or more picture position parameters comprise a position of the current picture in a group of pictures, wherein the position may be unknown, first among the group of pictures, last among the group of pictures, or in between other pictures in the group of pictures.

6. The method of claim 1, wherein the one or more picture position parameters comprise a first field denoting a first number of pictures prior in display order to the current picture with motion related to the current picture, and a second field denoting a second number of pictures subsequent in display order to the current picture with motion related to the current picture.

7. The method of claim 6, wherein the first field and the second field comprise positive, integer, numbers between 0 and N, wherein N is between 2 and 7 included.

8. An apparatus comprising a processor and configured to perform the method recited in claim 1.

9. A non-transitory computer-readable storage medium having stored thereon computer-executable instruction for executing a method with one or more processors in accordance with claim 1.

10. A non-transitory processor-readable medium having stored thereon an encoded video stream structure, the encoded video stream structure comprising:
an encoded picture section including an encoding of a sequence of video pictures; and
a signaling section including an encoding of metadata comprising syntax parameters for enabling displaying the sequence of video pictures at a variable frame rate, wherein the syntax parameters comprise a picture-timing-present flag, a picture-source-type flag, and a picture-position-type flag; and
for a current picture among the sequence of video pictures:
if the picture-timing-present flag is set to 1, then including
a duration of picture presentation time parameter in the metadata;
if the picture-source-type flag is set to 1, then including
a picture source parameter in the metadata, wherein the picture source parameter indicates one of an original picture, a replica of an original picture, or an interpolated picture; and if the picture-position-type flag is set to 1, then including
one or more picture position in a scene parameters in the metadata.

11. The non-transitory processor-readable medium of claim 10, wherein the syntax parameters further comprise a picture-motion-information-present flag, and
if the picture-motion-information-present flag is set to 1, then
including one or more picture-motion-related parameters in the metadata.

12. The non-transitory processor-readable medium of claim 10, wherein the picture source parameter denotes whether the current picture comprises an original picture, a duplicate picture, or an interpolated picture.

13. The non-transitory processor-readable medium of claim 10, wherein the one or more picture position parameters comprise a position of the current picture in a group of pictures, wherein the position may be unknown, first among the group of pictures, last among the group of pictures, or in between other pictures in the group of pictures.

14. The non-transitory processor-readable medium of claim 10, wherein the one or more picture position parameters comprise a first field denoting a first number of pictures prior in display order to the current picture with motion related to the current picture, and a second field denoting a second number of pictures subsequent in display order to the current picture with motion related to the current picture.

15. The non-transitory processor-readable medium of claim 14, wherein the first field and the second field comprise positive integer, numbers between 0 and N, wherein N is between 2 and 7 included.

\* \* \* \* \*